(12) United States Patent
Loui et al.

(10) Patent No.: US 7,845,301 B2
(45) Date of Patent: *Dec. 7, 2010

(54) VENTILATED AFT SWEPT FLOW INTERRUPTER HULL

(75) Inventors: Steven Loui, Honolulu, HI (US); Scott Yamashita, Honolulu, HI (US); Mealani Parish, Mililani, HI (US)

(73) Assignee: Navatek, Ltd., Honolulu, HI (US)

( * ) Notice: Subject to any disclaimer, the term of this patent is extended or adjusted under 35 U.S.C. 154(b) by 227 days.

This patent is subject to a terminal disclaimer.

(21) Appl. No.: 12/119,812

(22) Filed: May 13, 2008

(65) Prior Publication Data

US 2008/0210150 A1 Sep. 4, 2008

Related U.S. Application Data

(63) Continuation-in-part of application No. 12/050,565, filed on Mar. 18, 2008, which is a continuation-in-part of application No. 11/511,253, filed on Aug. 29, 2006, now Pat. No. 7,380,514, which is a continuation-in-part of application No. 11/294,416, filed on Dec. 6, 2005, now Pat. No. 7,299,763, and a continuation-in-part of application No. 11/315,304, filed on Dec. 23, 2005, now Pat. No. 7,311,059.

(51) Int. Cl.
*B63B 1/22* (2006.01)
(52) U.S. Cl. .................. 114/284; 114/289; 114/291
(58) Field of Classification Search .................. 114/284, 114/285, 288, 290, 291
See application file for complete search history.

(56) References Cited

U.S. PATENT DOCUMENTS

| | | | |
|---|---|---|---|
| 1,265,035 A | 5/1918 | Bazaine | |
| 1,665,149 A | 4/1928 | Van Wienen | |
| 2,172,674 A | 9/1939 | Frost | 114/288 |
| 2,753,135 A | 7/1956 | Gouge | 244/106 |
| 2,928,365 A | 3/1960 | Moon | 114/145 |
| 3,146,752 A | 9/1964 | Ford | 114/67 |
| 3,327,671 A | 6/1967 | Comins | 114/285 |
| 3,528,380 A | 9/1970 | Yost | 114/66.5 |
| 3,561,389 A | 2/1971 | Hunt | 114/66.5 |
| 3,662,700 A | 5/1972 | Roumejon | 114/67 |
| 3,709,179 A | 1/1973 | Payne | 114/66.5 |
| 4,067,286 A | 1/1978 | Stout et al. | 114/283 |
| 4,371,350 A * | 2/1983 | Kruppa et al. | 440/69 |
| 4,649,847 A | 3/1987 | Tinkler et al. | 114/39 |
| 4,682,560 A | 7/1987 | Lieb et al. | 114/343 |
| 4,685,889 A | 8/1987 | Nystrom | 440/69 |
| 4,689,026 A | 8/1987 | Small | 440/66 |
| 4,713,028 A | 12/1987 | Duff | 440/61 |
| 4,821,663 A | 4/1989 | Schad | 114/43 |
| RE33,165 E | 2/1990 | Whitehead | 440/69 |
| 4,907,520 A * | 3/1990 | Pipkorn | 114/61.3 |
| 4,915,668 A | 4/1990 | Hardy | 440/69 |

(Continued)

*Primary Examiner*—Stephen Avila
(74) *Attorney, Agent, or Firm*—Fitzpatrick, Cella, Harper & Scinto

(57) ABSTRACT

A boat hull has an aft swept ventilated area in at least a part of its bottom planing surface. An aft swept water flow interrupter is positioned to project downwardly from the hull forward of the ventilated area. The aft swept flow interrupter has two generally angularly related legs or sections defining a 30° to 70° included angle, increase lift on the hull, reduces wetted surface area and improves the turning characteristics of the hull.

25 Claims, 10 Drawing Sheets

U.S. PATENT DOCUMENTS

| | | | |
|---|---|---|---|
| 4,924,792 A | 5/1990 | Sapp et al. | 114/61 |
| 4,926,771 A | 5/1990 | Hull | 114/289 |
| 4,977,845 A | 12/1990 | Rundquist | 114/289 |
| 5,111,767 A | 5/1992 | Haines | 114/288 |
| 5,158,033 A | 10/1992 | Evans | 114/289 |
| 5,193,478 A | 3/1993 | Mardikian | 114/286 |
| 5,415,120 A | 5/1995 | Burg | 114/67 |
| 5,588,389 A | 12/1996 | Carter, Jr. | 114/271 |
| 5,970,898 A | 10/1999 | Pereira | 114/55.5 |
| 6,006,689 A | 12/1999 | Olofsson | 114/285 |
| 6,125,781 A | 10/2000 | White | 114/288 |
| 6,164,235 A * | 12/2000 | Hoppe | 114/275 |
| 6,213,824 B1 | 4/2001 | Small | 440/68 |
| 6,216,624 B1 | 4/2001 | Page | 114/145 |
| 6,250,246 B1 * | 6/2001 | Hubley | 114/288 |
| 6,406,341 B1 | 6/2002 | Morejohn | 440/69 |
| 6,425,341 B1 | 7/2002 | Devin | 114/288 |
| 6,604,478 B2 | 8/2003 | Barsumian | 114/67 |
| 6,684,807 B1 | 2/2004 | Smith | 114/286 |
| 7,299,763 B2 * | 11/2007 | Loui et al. | 114/288 |
| 7,311,059 B2 * | 12/2007 | Loui et al. | 114/288 |
| 7,380,514 B2 * | 6/2008 | Loui et al. | 114/285 |
| 2002/0174818 A1 | 11/2002 | von Wolske | 114/286 |

* cited by examiner

VENTILATED AFT SWEPT FLOW INTERRUPTER HULL

This application is a continuation-in-part of U.S. patent application Ser. No. 12/050,565, filed Mar. 18, 2008, which is a continuation-in-part of U.S. patent application Ser. No. 11/511,253 filed Aug. 29, 2006, now U.S. Pat. No. 7,380,514, which is a continuation in part of U.S. patent application Ser. Nos. 11/294,416, filed Dec. 6, 2005, now U.S. Pat. No. 7,299,763, and 11/315,304, filed Dec. 23, 2005, now U.S. Pat. No. 7,311,059. The disclosures of such applications are incorporated herein by reference.

SUMMARY OF THE INVENTION

The present invention relates to boat hulls and more in particular to boat or watercraft hulls having ventilated areas on the bottom of the hull and a flow interrupter forward of the ventilated area.

BACKGROUND OF THE INVENTION

Field of the Invention

Watercraft speed efficiency is achieved by reducing watercraft drag and improving the efficiency of the propulsion system. The result is higher speeds for the same amount of power used or less power needed to achieve the same speed.

One technology developed to accomplish this goal is the use of transverse steps or aeration recesses in the bottom or planing surface of a boat's hull which open to the atmosphere at the sides of the boat to unwet part of the bottom of the boat's hull and allow airflow under the hull to reduce drag. Such steps can extend all across the hull, partly under the hull from the sides towards the keel, towards the keel, or extend across the hull bottom in an aft swept or generally V shape wherein the forwardmost part is at the keel. In addition successive transverse steps may be provided along the length of the hull.

The effects of installing steps into the hulls of planing vessels are well known. Steps have the advantage of causing separation in the water flow beneath the hull, allowing for a portion of the hull to remain dry at high speeds. By allowing a portion of a hull to be dry or unwetted, two things are gained: increased efficiency due to unwetting of a portion of the hull and controlled placement of the center of pressure of the hull. The unwetting of the hull increases efficiency simply by reducing the total area of the hull touching the water. Since drag is directly proportional to area, the drag is reduced. Efficiency can be thought of as the ratio of lift to drag, thus by reducing drag, efficiency is increased.

The center of pressure of a hull can be thought of as the integral of the moment produced by the hull broken into infinitesimally small segments divided by the integral of the force produced by the hull broken into infinitesimally small segments. At a given speed, the boat will equalize so that the center of pressure is directly beneath the center of gravity of the boat. By changing the step size and placement, the equilibrium point will occur at different angles of attack of the vessel. Thus, by changing the center of pressure location (for a given angle of attack), the designer can change the running trim of the vessel. Moving the center of pressure allows the longitudinal center of gravity (LCG) of a hull to be changed and moved forward. Moving the LCG in conventional planning hulls improves seakeeping by reducing motions in waves, especially pitch.

Transom mounted flow interceptor plates such as shown in U.S. Pat. No. 6,006,689, also have been found to reduce hull drag by providing lift which reduces hull immersion in the water. Reducing hull drag improves watercraft seakeeping and propulsive efficiency by providing trim control forces to achieve the optimal watercraft trim (which varies with speed) for watercraft weight and sea conditions. Such systems are usually mounted directly at the transom, which creates large trimming moments that can push the bow down and create an adverse trim condition.

By placing an obstruction, such as a flow interceptor plate or other form of flow interrupter, perpendicular to the flow, a stagnation region on the hull can be achieved. By generating this high pressure stagnation region, a vertical force on the hull is generated in front of the interceptor and, at sufficient speed, water separation occurs.

Flow interceptors have successfully been implemented to control trim in vessels by generating moments at desired locations along the length of the vessel. They have the desirable behavior of being dynamically neutral regardless of their placement on a hull. In other words, the amount of lift it generates is a function of velocity, not trim.

In the parent applications identified above it was disclosed that by using a flow interceptor in a novel position on a hull at the leading edge of a hull's ventilating propulsion tunnel, entrapment tunnel, or rocker, improved control of water flow and propulsive efficiency were achieved.

The use of cambered lifting surfaces on boat hulls also has known advantages. Cambered shaped lifting surfaces are a form of flow interrupter and, when added to the bottom of a hull, inline with the flow, increased vessel efficiency and center of pressure placement also can be achieved. The cambered lifting surface, in essence, acts as the underside of a hydrofoil. By redirecting the flow along the hull, an amount of circulation is achieved, along with a slight area of stagnation, producing a positive pressure along the hull. This pressure integrates into a vertical force on the hull. Cambered lifting surfaces have been shown to produce lift to drag ratios much higher than that of typical prismatic planing surfaces.

The use of wedge shapes on the bottoms of boat hulls also provides a flow interrupter and is known to produce increases in efficiencies similar to those of interceptors and cambered lifting surfaces. A protrusion into the flow at high enough speed will produce a region of high pressure forward of the protrusion. The high pressure region, in turn, produces a vertical force on the hull. If the protrusion is deep enough, and the speed high enough, separation will occur behind the protrusion. Depending on the shape, the depth into the flow, the speed, and the trailing edge's ability to ventilate to the free surface, the levels of force and separation will vary.

As described in U.S. application Ser. No. 12/050,565, filed Mar. 18, 2008, the efficiency of operation of a planing vessel or watercraft with a stepped hull is improved by adding a protrusion or flow interrupter into the water flow beneath the hull. The inclusion of the protrusion into the flow in front of a ventilation step will increase the efficiency of the vessel at moderate to high speeds and can improve on the overall design of said vessel.

The inclusion of a protrusion or flow interrupter forward of such steps provides all of the positive effects of the pre-existing step, i.e., water separation from the hull and aeration of a portion of the hull, but it also increases the amount of hull unwetting and the speed range over which unwetting occurs. In addition hull lift is increased as the result of the creation of a high pressure area forward of the step.

It is an object of the present invention to provide increased efficiency of a planing vessel under different loading conditions and in different sea conditions.

It is a further object of the present invention to provide such increased efficiency through the effective control of vessel trim and through the development of lift under the vessel by the creation of stagnation points.

It also is an object of the present invention to increase dynamic lift in hulls.

A still further object of the present invention is to provide a protrusion, located forward of a pre-existing ventilated area in a planing hull bottom to generate a high pressure region forward of said step.

Yet another object of the present invention is to increase the unwetted portion of the hull thus increasing the overall efficiency of said hull.

It is another object of the present invention to increase the speed range over which water separation from the hull occurs, thus increasing the efficiency of the vessel over a wider speed range.

Another object of the present invention is to achieve each of the above objects while also reducing the turning radius for the hull.

BRIEF DESCRIPTION OF THE INVENTION

In accordance with an aspect of the present invention the trim of a watercraft hull or vessel is efficiently and effectively managed by controlling the forces applied to and the wetted surface area of the underwater body, bottom or working, planing surface of a ventilated planing hull through the use of flow interrupters.

The improvements to a vessel's efficiency due to additional hull unwetting from flow interrupters or protrusion forward of a ventilated area or step in a hull are due to the diversion of the water flow. When a protrusion is introduced into a flow traveling at moderate to high speeds, the flow will be diverted to follow the protrusion. In the gradual case, such as with a wedge, the flow will release tangentially to the wedge surface. The momentum in the flow will prevent it from reattaching to the hull immediately. The flow will instead reattach further down the hull than it would for a step alone. That is, for the original step, the reattachment point will be closer to the detachment point than in the case of a protrusion into the flow. The reattachment point will vary depending on the speed of the flow, the angle of the wedge and the viscosity of the fluid.

The limiting case of a wedge protrusion is an interceptor or interceptor plate. This is, in effect, a wedge with infinite slope.

Flow interceptors are flat plates subtending vertically downward from the hull of a vessel such that when the vessel is in operation and water is flowing along the surface of the vessel the interceptors cause a flow stagnation pressure lift to be created on the upstream side of the plate, or just forward of the interceptors.

This higher pressure area causes a vertical force to be developed onto the surface in the region of the vertical plate in the flow stream. In naval architecture and hydrodynamics such vertical plates installed for the purpose of generating vertical force are referred to as interceptors. Interceptors affixed to the underwater body of a vessel when the vessel is underway and having water flow along the underwater body will generate the higher pressure area causing a lifting force on the vessel, and if the interceptors are aft then the force will cause the stern to be raised relative to the bow. The vessel is then said to be trimmed down by the bow. The present invention enables proper placement of the LCG further forward than in conventional boats without detrimental too flat running trims.

As compared to a transom mounted interceptor, an interceptor plate mounted in a hull forward of the transom provides greater lift and reduction of hull immersion and also provides improved trim control forces.

In the case of the interceptor placed in front of a hull step or ventilated area according to the present invention, the flow is not gradually moved away from the hull. Rather, the flow will hit the interceptor plate and stagnate, causing a region forward of the plate where the flow is stationary. At the interceptor, the flow will be stationary for the entire depth of the plate. As one travels forward of the interceptor, the stationary region will become shallower. In essence, this makes a wedge shape of stationary flow. The moving flow will pass over this stationary flow and separate at the plate at an angle tangent to the stagnation zone angle. So, the interceptor plate actually acts very similar to a wedge in terms of creating flow separation.

Similar effects can be achieved by the use of a cambered lifting surface on the bottom of a hull forward of a step or ventilated area. A cambered lifting surface has a trailing edge that is nearly vertical. It acts as a kind of hybrid between a wedge and an interceptor. The lead up to the trailing edge is gradual, as in a wedge, but the trailing edge tangency points downwards as in an interceptor.

The improvements to hull efficiency due to increased lift from the protrusion or interrupter are the result of the incompressibility of water. Because water is incompressible, if it is forced in one direction while surrounded by infinite fluid, the pressure will increase. This increase in pressure will be applied to the surface normal to it, in this case the hull. In the case of a simple shape, like a wedge, the flow is not moved very far or very fast. Therefore, the increases in lift will be small. However, in the case of an interceptor plate, a slightly different behavior occurs. The interceptor is extended into the boundary layer of the hull (the region close to the hull where the water has not yet reached free stream velocity). As a result the flow stagnates forward of the interceptor creating a large high pressure area. Forward of this high pressure area, the flow is diverted as with a wedge. So, the interceptor creates a high pressure area due to the halting of the boundary layer as well as a high pressure area due to the diversion of the flow. A cambered lifting surface diverts the flow similar to a hydrofoil. A small portion of the surface protrudes into the flow at the leading edge, causing a stagnation line. Aft of the stagnation line, the flow is forced to follow a curved surface until the trailing edge. This motion, as with the wedge, increases the pressure under the hull. In the case of the cambered lifting surface, a slight high pressure due to the stagnation line and an increase in pressure due to the diversion lead to a total increase in lift. All three of these shapes (and any other shape protruding into the flow) will generate drag along with lift. If the lift to drag ratio is higher than that of the hull, any increase in lift will lead to a more efficient overall system.

It has been found that additional advantages arising from the use of flow interrupters with ventilated steps or areas on a hull bottom can be achieved by locating the interrupters in an aft-swept arrangement with at least part of the interrupter forward of the longitudinal center gravity (LCG) of the watercraft. Such an arrangement produces improved lift and efficiency when the vessel is running forward as described above. In addition, however, when the interrupters are positioned in this way substantially improved turning of the vessel is achieved. The aft-swept flow interrupter arrangement substantially reduces the watercraft's turning radius and causes the hull to bank and pivot around the LCG.

The improved turning feature of an aft-swept flow interrupter can be achieved either through the use of the interrupter with a ventilated step or with a conventional hull having air ventilation channels openings in the hull to which air is supplied while the vessel is underway.

The above and other objects, features and advantages of the present invention will become apparent from the following detailed description of illustrative embodiments thereof, which is to be read in conjunction with the accompanying drawings, wherein:

DETAILED DESCRIPTION OF THE PREFERRED EMBODIMENTS

Figure 1A:
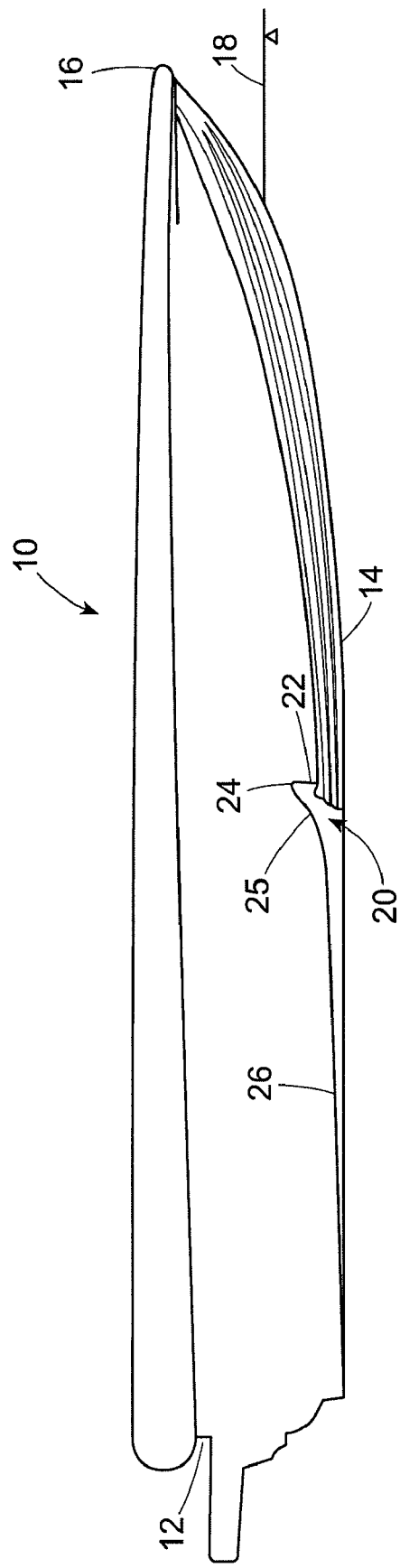
FIG. 1A is a side elevational view of a planing boat hull having a conventional ventilation and unwetting step in its bottom.

Referring now to the drawings in detail, and initially to FIG. 1A, a generally conventional boat hull 10 is illustrated which includes a rear transom 12, a hull bottom, planing, or working surface 14 and a bow 16. The hull is shown at rest at an even keel, i.e., without trim, and has a design water line 18. Hull bottom 14 is a planing surface which has a V shaped form in transverse cross-section with constant deadrise moving aft towards the transom.

It has become common in such boats to provide the hull with a step or ventilation channel 20 (sometimes called an aeration channel) in the hull bottom that extends from one side, transverse to the keel, to the other side of the hull. These are either straight across the hull or angled to the keel at either an aft or forward extending swept angle or combination thereof. Such steps typically have a relatively flat front face 22, a curved top 24 and a tapered aft surface 25 which returns to the hull bottom or keel line 26 aft of the step top 24.

As a boat having a stepped planing surface, as described above, moves through the water on a plane the forward part of the hull rises out of the water and the aft part of the bottom skims or planes on the water surface. A step in such a hull causes the water immediately behind it to separate from contact with the hull, effectively unwetting the surface of the hull at and aft of the step. The step allows air to enter the space in the step above the separated water which in turn keeps water out of that space and resists reattachment of the water to the hull. This serves to reduce drag on the hull thereby improving the efficiency of the hull.

Figure 1B:
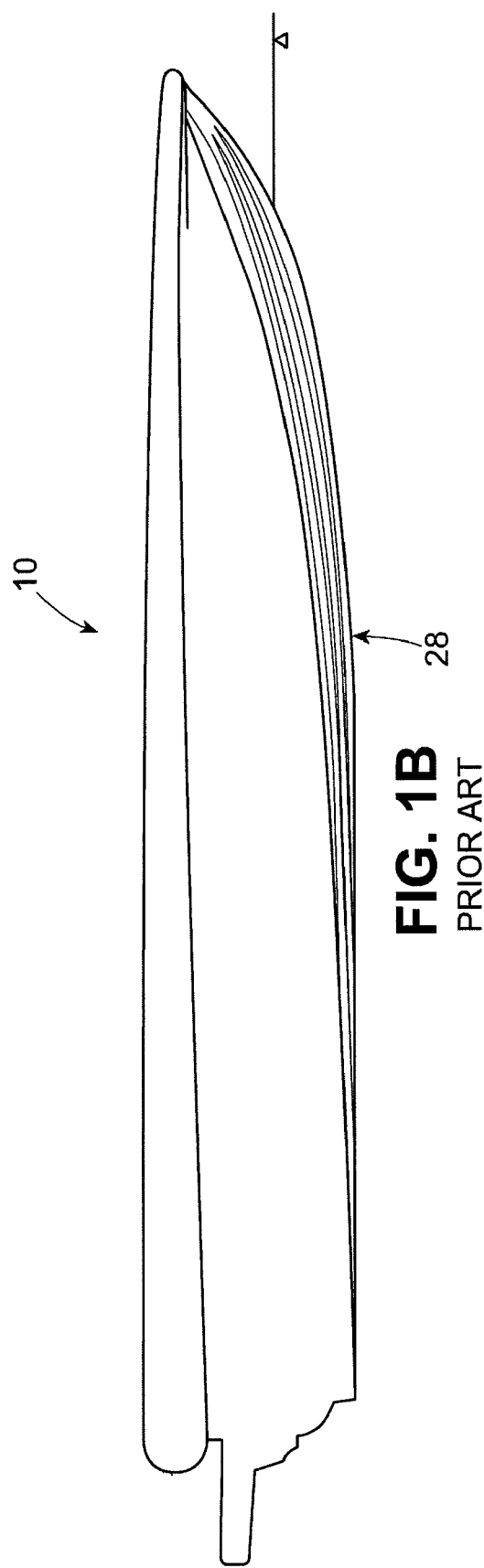
FIG. 1B is a side elevational view similar to FIG. 1A of a conventional planning hull having air ventilation holes or channels in its bottom.

A very similar effect can be achieved with a conventional unstepped hull as shown in FIG. 1B by providing a series of ventilation holes or air passages 28 in the hull bottom. These holes or passages are connected through conventional known duct work which opens to the atmosphere (or to a source of pressure air), above the waterline of the boat as described hereinafter with respect to FIG. 7. As a result when the boat is in motion air is supplied to the ventilation holes to cause water to separate from the hull thereby reducing wetted surface area and drag on the hull. These ventilation holes or passages can be arrayed in any known manner but typically are provided in a generally V-shaped pattern with the forwardmost hole or holes at or adjacent the keel and the remainder swept aft and toward the sides of the hull.

Typically, in these prior art structures, there is no area of higher pressures on the hull bottom immediately preceding the step of the ventilation holes. This is because changes in pressure only occur at locations where there is a change in the angular momentum of the flow. Since the hull bottom longitudinal sections immediately preceding the step or ventilation holes are typically straight and flat there can be no change to the angular momentum of the flow and hence no increases in hull pressures.

As described above, the present invention involves the placement of a protrusion or water flow interrupter immediately forward of a step or array of ventilation holes in the hull bottom. The purpose of the interrupter is to produce increased lifting pressure immediately forward of the step or ventilation holes along with increased water separation, to produce a greater unwetted surface area than the step alone or with no ventilation holes. This protrusion can take several forms as described in U.S. patent application Ser. No. 12/050,565, filed Mar. 18, 2008. These interrupters can be used immediately forward of or at the leading edge of the ventilation steps or array of ventilation holes.

One form of interrupter suitable for use with the present invention is a so-called interceptor plate, such as is disclosed in U.S. Pat. No. 6,006,689. This plate is also shown in greater detail in FIG. 2D.

Figure 2:
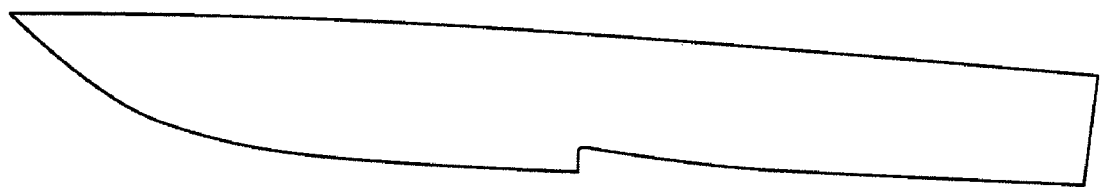
FIG. 2 is a longitudinal sectional view of the hull of FIG. 1A illustrating the shape of the ventilation step therein.
Figure 2A:
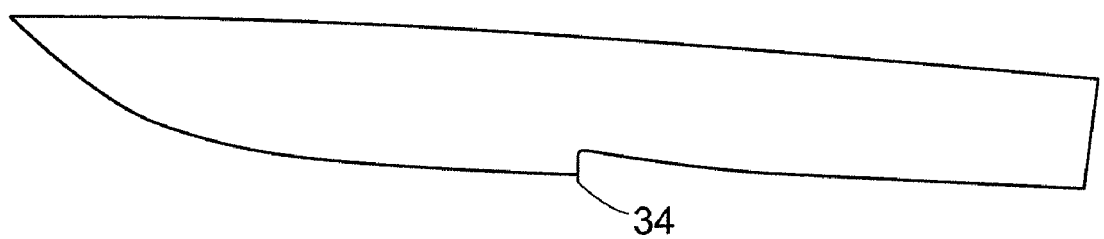
FIG. 2A is a sectional view similar to FIG. 2 schematically illustrating an interceptor plate used as a flow interrupter extended at the leading edge of the ventilation step.

In the embodiment of FIG. 1A, the interceptor plate is an elongated flat plate mounted at the front of the step to extend below the bottom surface of the hull as shown in FIG. 2A. The interceptor plate 34 can be a fixed plate of a selected depth or height, for example, ½ inch to 1 inch, or it can be a movable plate as shown in FIG. 2D that can be retracted or extended to the desired depth. With the interceptor plate extended, water passing under the boat at speed stagnates against the plate causing the water forward of the plate to form a stationary body of water much like a wedge. This stationary region becomes shallower, i.e., is closer to the hull, as one moves forward. The surrounding flowing water will pass over this stationary wedge shaped body of stagnated water and separate from the hull at the bottom of the plate at an angle which is tangent to the stagnation zone angle. Because of the stagnation zone, higher lift pressure is created against the bottom of the hull and an enlarged ventilated area aft of the step before the water reattaches to the hull.

In another embodiment, the interceptor plate or plates can be raised and lowered in its housing (FIG. 2D) in any convenient manner, as for example by electromagnetic devices or hydraulic rams or the like.

The use of an interrupter, and particularly an interceptor plate allows the trim characteristics of a hull to be fine tuned. It is a tool that is easily installed on an existing hull which can improve seakeeping by balancing movements without loss in efficiency.

As noted above, by properly positioning the flow interrupter or interceptor plate, not only will the above-described advantages be achieved but improved controlled turning of the hull is accomplished by reduction of the hull's turning radius.

Figure 2B:
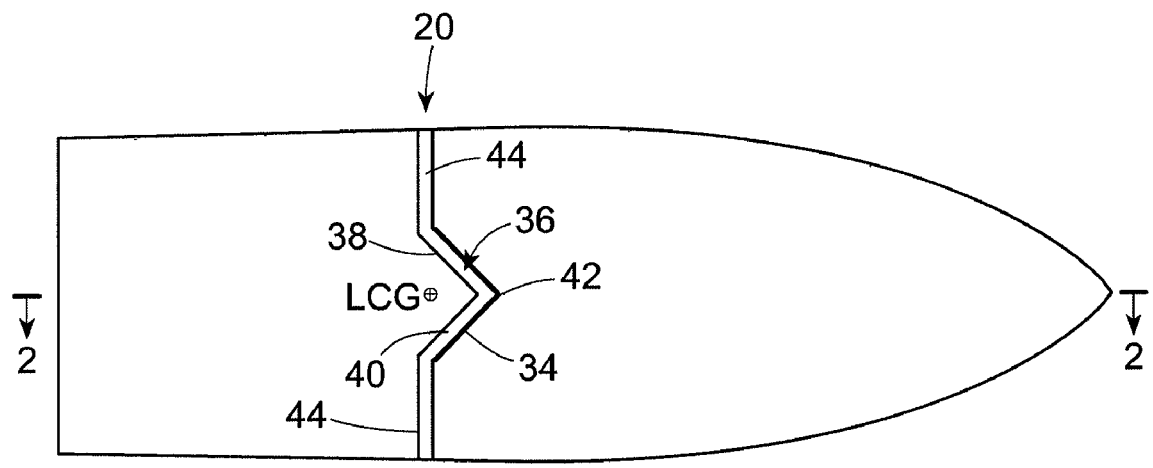
FIG. 2B is a bottom view of the hull shown in FIGS. 1A and 2A illustrating the location of the aft-swept flow interceptor plate relative to a ventilation step having a central aft swept portion forward of the hull's LCG.

FIG. 2B shows one embodiment of the invention in which the ventilation step 20 has a central aft swept, generally V-shaped in plan section 36 including two diverging legs 38, 40 which extend from a foremost point 42 of step 20 at the central keel line of the boat. In this embodiment step 20 has end portions 44 which extend from the ends of legs 38, 40 of the step to the sides of the hull thereby allowing air flow therein.

As illustrated in FIG. 2B the interceptor plate 34 is located at the forward end of the aft-swept V-shaped portion 36 thereof. The flow interceptor may be formed as one V-shaped plate or two angularly related individual plates. Or, each leg of the interceptor can be formed of multiple plates.

In accordance with this invention, and in each embodiment thereof described hereinafter, the angle between the legs of the aft swept flow interrupter, whether flow interceptor plates or otherwise, is preferably between 30° and 70°. In FIG. 2B that angle is show at 45°. In addition the aft-swept interceptor is located forward of the LCG of the hull.

As described hereinafter aft swept interceptors with this arrangement not only increase lift and efficiency of the hull but also allow the hull to make sharper turns at a smaller turning radius.

Figure 2C:
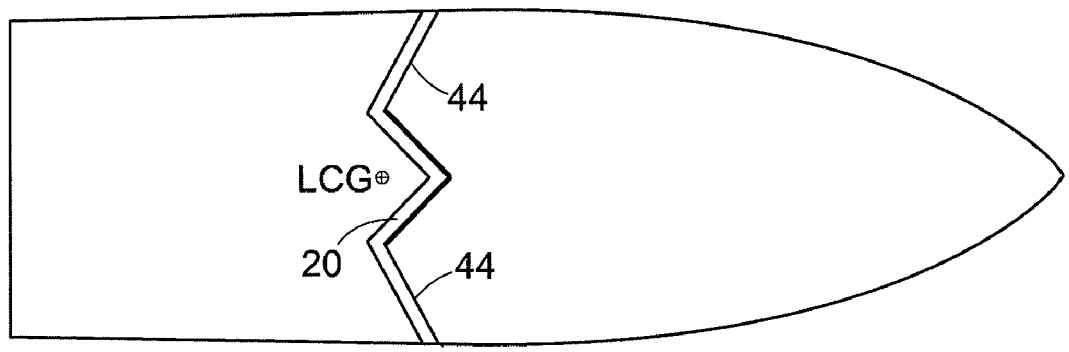
FIG. 2C is a bottom view similar to FIG. 2B showing a ventilation step in the hull whose central portion is swept aft and whose outer portions are swept forward.
Figure 2D:
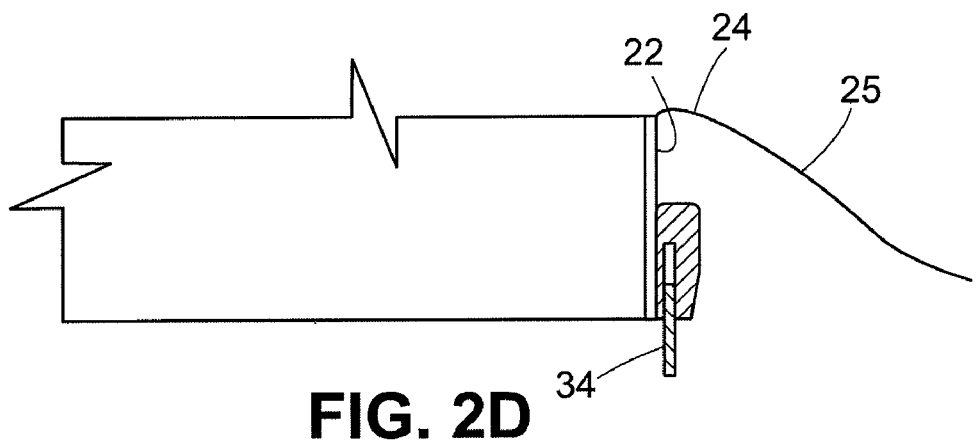
FIG. 2D is an enlarged sectional view of a step and interceptor plate structure suitable for use in the embodiments of FIGS. 2-2C.

Another hull embodiment using a ventilation step and flow interrupter is shown in FIG. 2C. In this embodiment the ends 44 of the ventilation step 20 are swept forward and to the sides of the hull, again to allow air to enter the step and ventilate the hull. The central aft swept section of the step and the interceptor plate flow interrupter arrangement is the same as described above with respect to the embodiment of FIG. 2B.

Figure 2E:
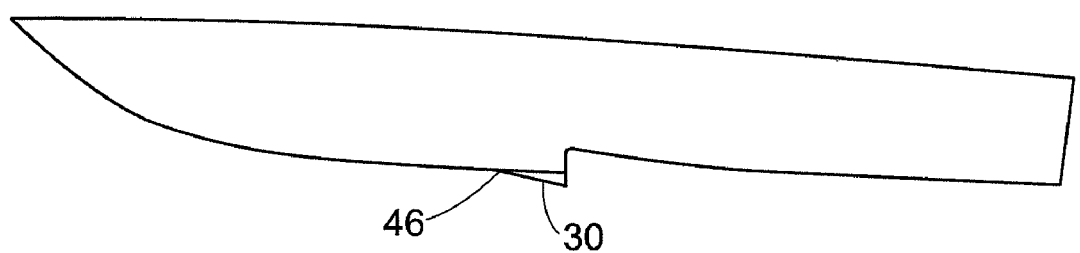
FIG. 2E is a sectional view similar to FIG. 2A showing a stepped hull with a wedge shaped flow interrupter forward of the step.

As discussed in patent application Ser. No. 12/050,565, filed Mar. 18, 2008, as an alternative to the use of a water flow interceptor plate, the flow interrupter device may be in the form of a wedge shaped surface area formed in the hull forward of the ventilation step or holes. The wedge, as illustrated in FIG. 2E tapers downwardly from a point 46 on the hull bottom surface forward of the step to the leading edge of the step along the legs 38, 40 of the aft-swept portion 36 of the step. This wedge extends preferably along the bottom of the boat along the legs 38, 40 and forward therefrom to the hull bottom; the forward length of the wedge is preferably the same dimension across the length of the legs 38, 40.

As a result the water flow along the bottom of the boat in the area forward of the wedge which is in contact with the water surface at operating speeds is diverted to follow the wedge shape. The momentum in the flow prevents the water from reattaching immediately to the hull and, because it is diverted downwardly, the water produces increased pressure on the hull as it moves forward increasing lift.

Figure 2F:
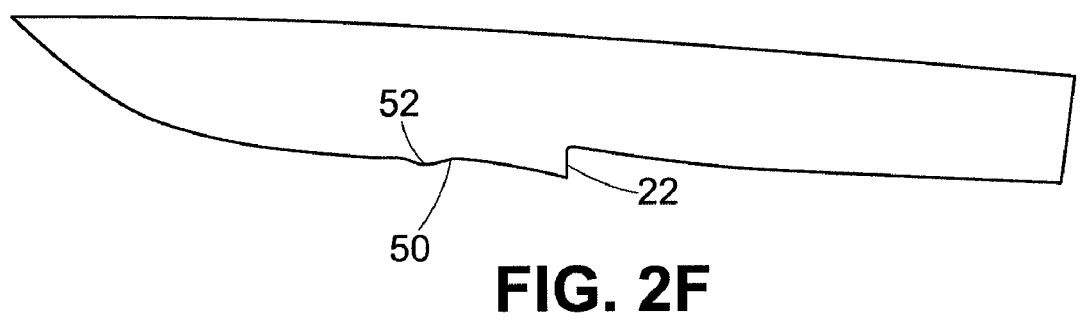
FIG. 2F is a sectional view similar to FIG. 2A showing a cambered lifting surface as a flow interrupter forward of the step.

Yet another way of implementing the present invention is shown in FIG. 2F in which a cambered surface 50 is formed in the bottom of the hull and takes the general shape of the underside of a hydrofoil. The cambered lifting surface is concave relative to the water and its trailing end ends at the bottom of the step surface 22. Using a cambered lifting surface in this way when the vessel is in motion a first area of moderate high pressure is created in front of the leading edge 52 of the cambered surface and produces a higher pressure zone in front of the step much in the way that that occurs with the wedge described above. However, because the trailing edge tangency is greater in the downward direction than with the wedge, the pressure area produced is greater.

Figure 7:
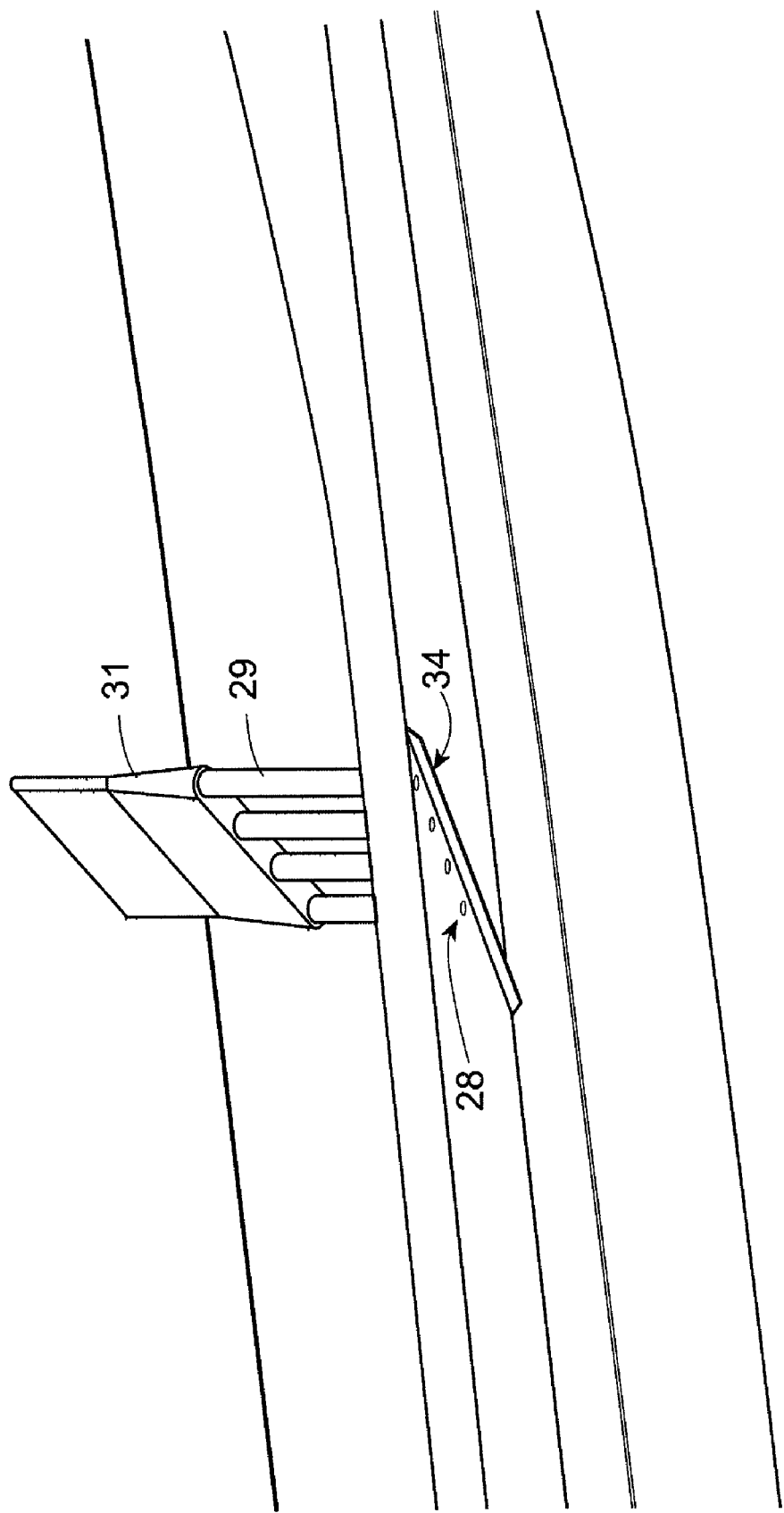
FIG. 7 is a longitudinal sectional view of the hull shown in FIG. 3A showing an air supply system for the ventilating holes or channels of the hull.

FIG. 7 illustrates how the ventilation holes 28 in the bottoms of these hulls (specifically the hull of FIG. 3A), behind the interrupter 34 are ventilated to the atmosphere. As seen therein, each hole is connected to a tube 29, each of which is connected to a manifold 31. A duct 33 connected to the manifold has an open upper end above the water line of the vessel which is open to the atmosphere to supply air to the holes 28 in the space behind the interrupter.

The wedge and cambered surface arrangements described with respect to FIGS. 2E and 2F can be used in lieu of the interceptor plates in the embodiments of FIGS. 2B and 2C. In addition it is to be understood that the ventilation steps 20 may extend entirely across the hull from keel to sides in the preferred aft swept arrangement with the flow interrupters described extending entirely across their width.

Figure 3:
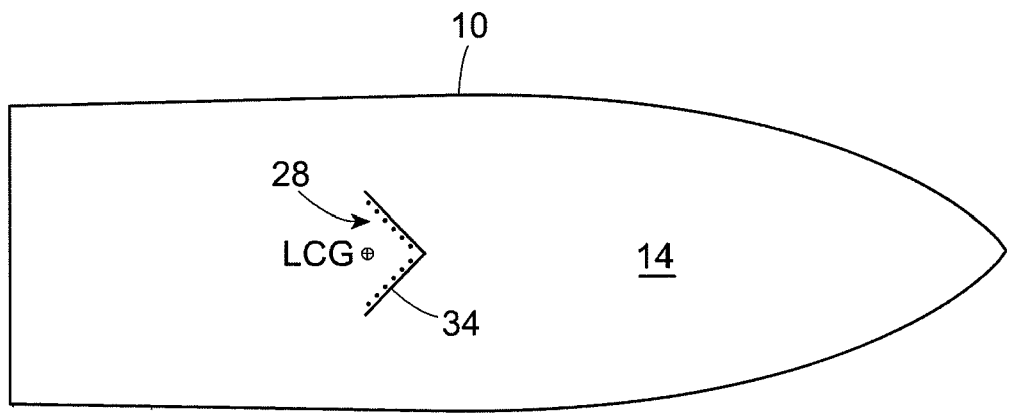
FIG. 3 is a bottom view of the hull of FIG. 1B showing the use of an aft swept flow interceptor plate in the hull bottom forward of the ventilation holes or channels formed therein.
Figure 4:
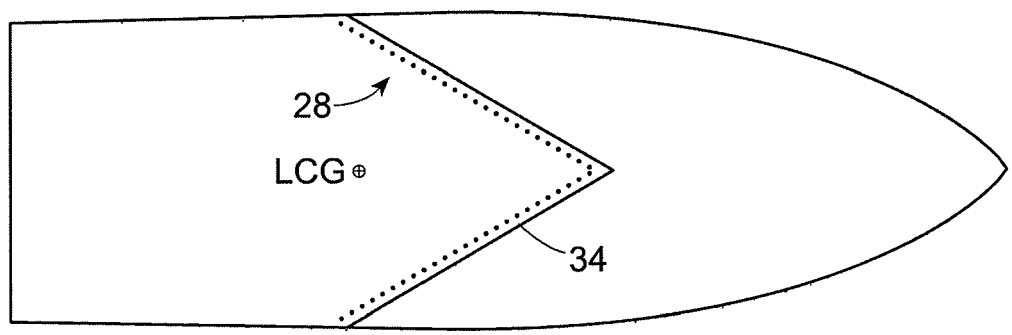
FIG. 4 is a bottom view similar to FIG. 3 showing the use of an aft swept flow interceptor plate forward of the hull's ventilation holes or channels extending across the bottom of the boat with a portion of its outside ends extending aft of the hull's LCG.
Figure 5:
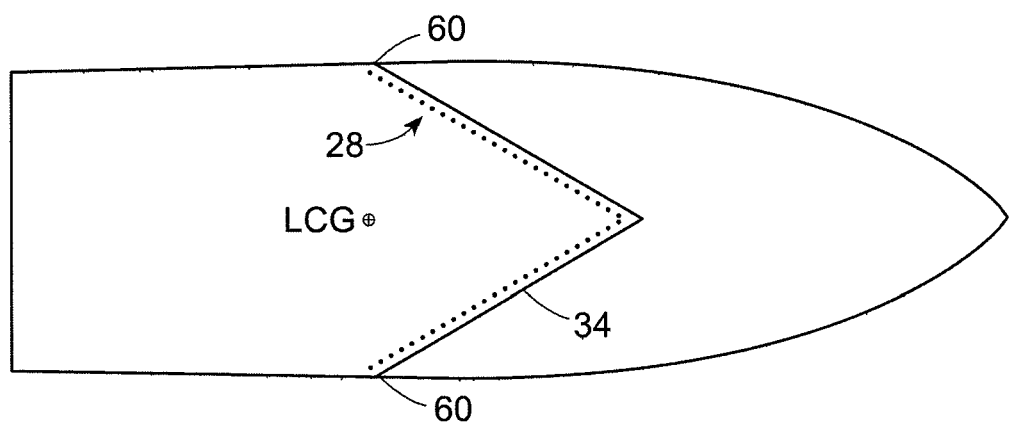
FIG. 5 is a view similar to FIG. 4 showing an aft swept flow interceptor plate in a hull bottom with its outer ends in lateral alignment with the hull's LCG.
Figure 3A:
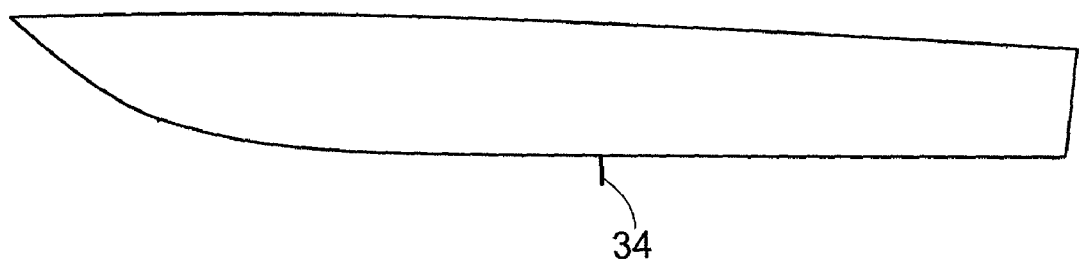
FIG. 3A is a longitudinal sectional view of the hull of FIGS. 1B and 3 schematically showing the flow interceptor plate extended.

Further ways of implementing the present invention with hulls using ventilation holes or passages with interceptors as illustrated in FIGS. 2B-2C are shown in FIGS. 3-5. These figures illustrate the boat hull 10 of FIG. 1B having ventilation holes 28 formed in the bottom 14 of the hull in an aft-swept or V shaped configuration. In FIGS. 3 and 3A the ventilation holes are located only in a central portion of the hull bottom symmetrically about the longitudinal axis or keel of the boat. In FIGS. 4 and 5 the aft swept ventilation holes are shown extending aft from the central longitudinal axis of the hull to the sides of the hull. In each case a flow interrupter 34 consisting of a V shaped flow interceptor plate, or plates, as discussed above, is positioned immediately forward of the ventilation holes and ventilated area. As described above with regard to the earlier embodiments the angle between the swept back legs of the array of ventilation holes and the legs of the flow interrupter is preferably between 30° and 70°.

In each of the embodiments the flow interrupter, ventilated area and center of lift provided by the flow interrupter is forward of the LCG of the hull although, as seen in the embodiments of FIGS. 3 and 4 the trailing ends 60 of the flow interrupter can be located somewhat aft of the LCG. In the embodiment of FIG. 5 the ends 60 of the flow interceptor plates are laterally aligned with the LCG.

Figure 3B:
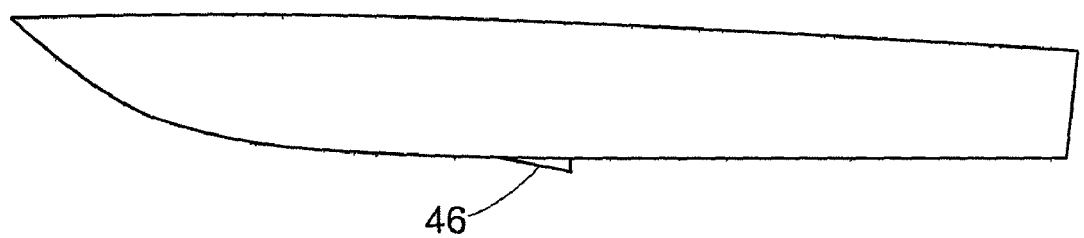
FIG. 3B is a longitudinal sectional view similar to FIG. 3A showing the use of a wedge shaped flow interrupter forward of the ventilation holes or channels in the hull.
Figure 3C:
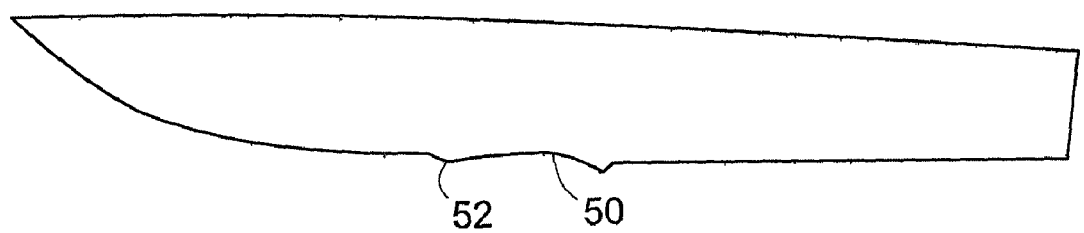
FIG. 3C is a longitudinal sectional view similar to FIG. 3A showing the use of a cambered flow interrupter forward of the ventilation holes or channels in the hull.

Instead of using interceptor plates as flow interrupters, the boat hulls of FIGS. 3, 4, and 5 can be provided with wedges 30 or cambered surfaces 40 forward of the ventilation holes as described above with regard to the stepped hull configuration and shown in FIGS. 3B and 3C.

Figure 8A:
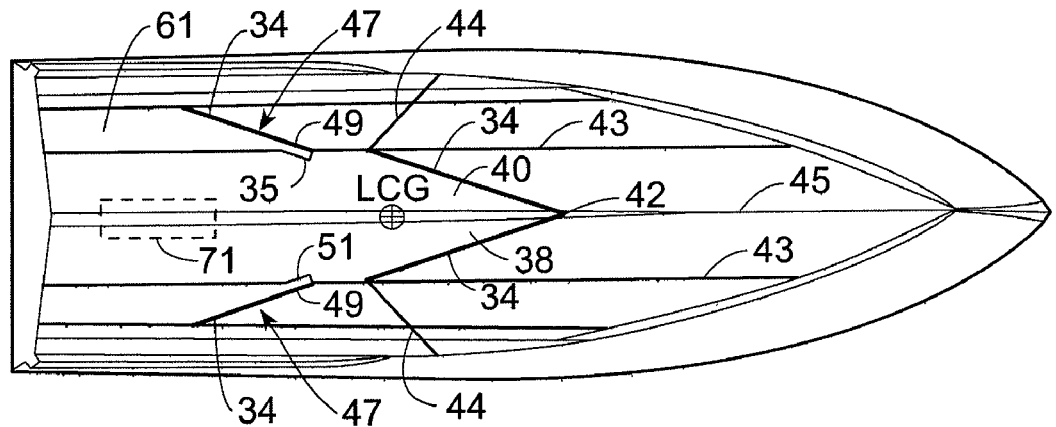
FIG. 8A is a bottom view similar to FIG. 2C illustrating a further embodiment of the invention using an aft set of flow interrupters.
Figure 8B:
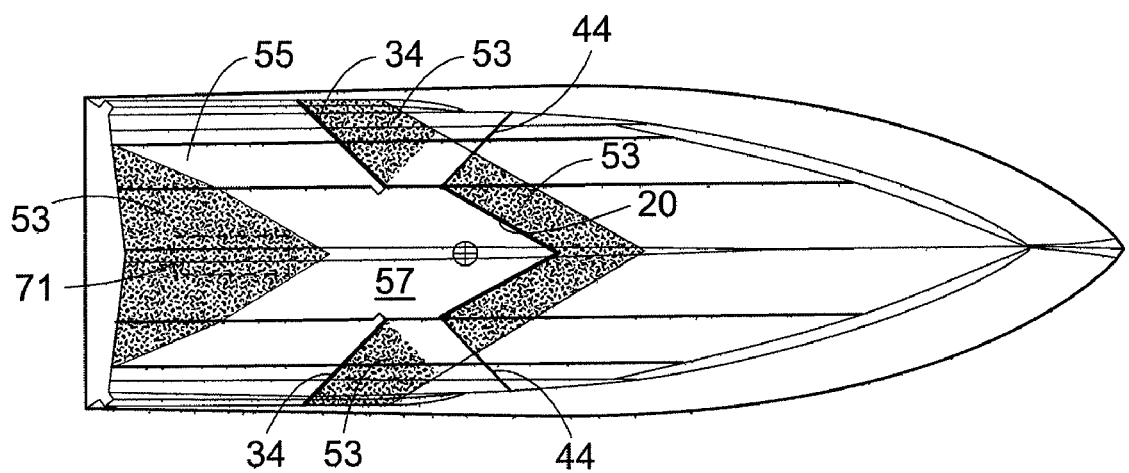
FIG. 8B is a bottom view of the hull shown in FIG. 8A and illustrating the location of air and water under the hull.

FIGS. 8A and 8B illustrate a modified version of the hull shown in FIG. 2C. In this embodiment the hull has a ventilation step 20 including a central aft swept, generally V shaped in plan section 36 including two diverging legs 38, 40 which extend from the foremost point 42 of step 20 at the central keel line of the boat. As in the FIG. 2C embodiment the aft swept central section 36 is forward of the LCG of the hull and adjoin end portions 44 of step 20 which are swept forward to the sides of the hull and allow air to enter the step.

In this embodiment, as illustrated, the hull has mid-running strakes 43 which protrude from the hull bottom in the usual fashion known to those skilled in the art about half way between the keel 45 and the sides of the hull to provide lift and tracking stability. In addition a second flow interrupter arrangement is provided aft of the LCG outboard of the running strakes 43. This second flow interrupter consists of aft swept interrupters 47 in the outboard panels of the hull bottom, outboard of the strakes 43. These interrupters each may take any of the forms previously described, e.g., a wedge or cambered surface or an interceptor plate 34 as schematically shown in the drawings.

Immediately behind the forward end 49 of each flow interrupter or interceptor plate 34 a channel 51 is carved or cut into the running strake to allow air flow from the inner side of the strake to the rear of the interceptor plate 34. As described hereinafter this arrangement provides additional ventilation for the hull and provides further lift to balance dynamic movements of the boat.

FIG. 8B schematically illustrates the ventilated and wetted areas of the hull of FIG. 8A. As seen therein with the structure as described above with respect to FIG. 8A the wetted surface area of the hull bottom is illustrated by the speckled areas 53. The hull is ventilated (i.e., exposed to the air) in the unspeckled areas 55 as a result of water separation from the hull caused by the step 20 and the flow interrupters 34. Air enters the aft swept legs of forward step 20 from the forward swept legs 44 thereof and helps keep the water separated from the hull in the area 57 behind the interrupters before the water "reattaches" to the hull rearwardly of the interrupter or interceptor plates 34, as shown. The air behind the aft swept legs of the step 20 and forward flow interrupters is also allowed, by the channels or recesses 51, to communicate with the areas 61 behind the aft flow interrupters 47 to provide additional hull ventilation at that point where the water has again separated from the hull due to the pressure of the flow interrupters.

The configuration of the hull bottoms and flow interrupters as described with respect to FIGS. 8A and 8B simplifies the hull vent system in that the forward swept step in the hull ventilates not only the forward step but also the aft swept outboard flow interrupters. Those aft swept outboard flow interrupters do not require the use of ventilation holes or a step since the channels 51 act as eductors drawing ventilation air from the forward step. Drawing air from the center hull panels between the mid-running strakes provides the further benefit of improving hull "grip" on the water for better maneuvering.

Finally, it is believed that this arrangement can be used to permit a stepped hull to be driven by a waterjet propulsor (whose water intake 71 is illustrated by dotted lines in FIG. 8A). This is because the second aft set of flow interrupters will allow air from the step to flow away from the hull before the air intake, thereby to avoid ventilating the intake.

Figure 6A:
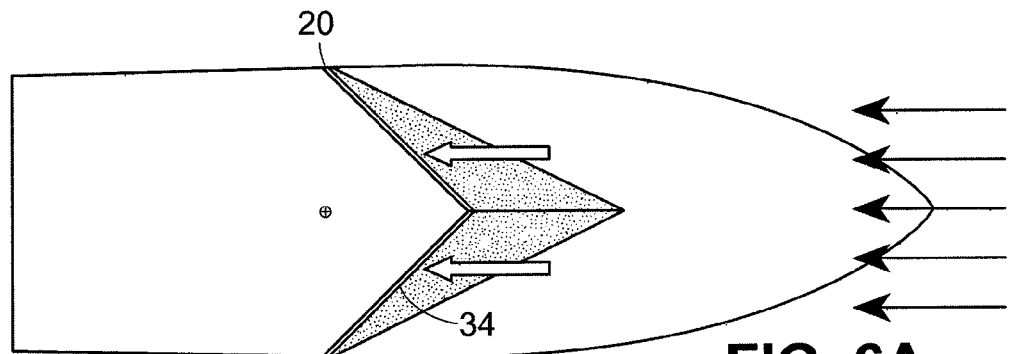
FIG. 6A is a schematic bottom view similar to FIG. 5 showing the area of increased lift forward of the aft swept flow interrupter as the hull moves ahead through the water.
Figure 6B:
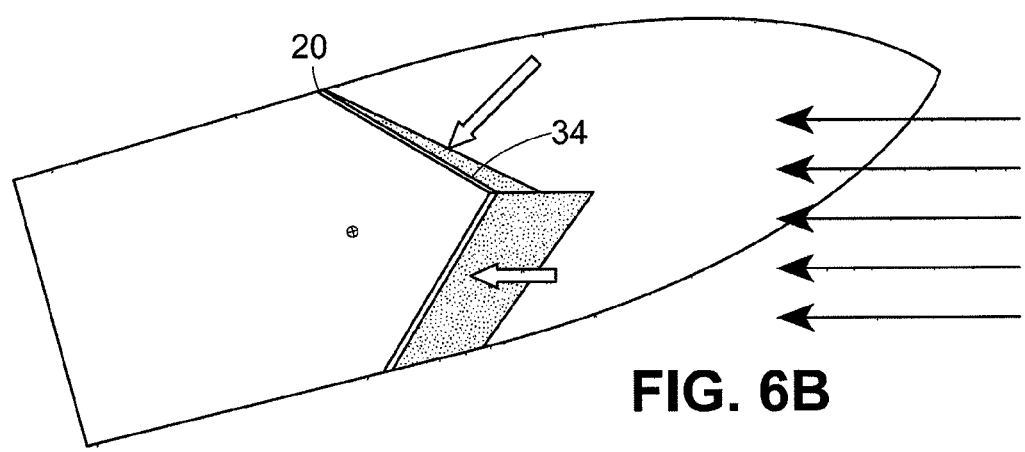
FIG. 6B is a view similar to FIG. 6A but showing the change in lift as the hull begins to turn to port.
Figure 6C:
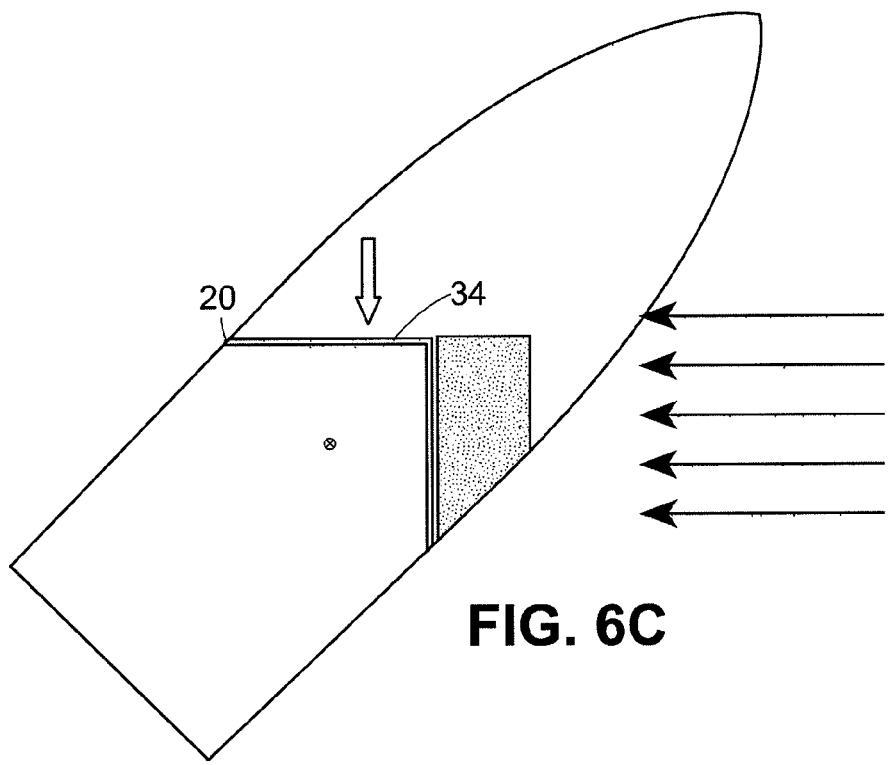
FIG. 6C is a view similar to FIG. 6B but showing the hull at 45° to its former line of forward motion and the resulting effects of the flow interrupter on lift and drag induced thereby on the hull.

Turning now to FIGS. 6A-6C the advantages of aft swept ventilation flow interrupters in improving boat turning will be described. FIG. 6A illustrates schematically a boat hull as described above using aft swept interceptor plates in front of either a V shaped step, or a V shaped array of ventilation holes, in the hull which is moving in the forward direction. The water flow under the hull is intercepted by the interceptor plate or plates 34 and separated from the hull to unwet the step or ventilated area aft of the interceptor plates. This produces increased lift forward of the LCG with symmetrical drag on the interceptor plate on opposite sides of the keel. In this embodiment the included angle between the legs of the interceptor is 45°.

As the boat of FIG. 6A begins to turn to port, as shown in FIG. 6B the part of the interceptor plate 34 which is on the starboard side of the hull becomes more normal (towards perpendicular) to the flow generating higher stagnation pressures on that side of the hull which produce greater lift on the starboard side. This lift banks the hull into a port side turn. At the same time, as the hull banks to port that side of the hull becomes more immersed and the drag on the port side of the interceptor plate increases. This increased drag helps the boat to pivot into the turn.

As the turn approaches 45° the boat is heavily banked with the starboard portion of the interceptor completely normal to the water flow resulting from the prior forward motion. This generates maximum lift on the starboard side of the hull (which is the outboard side of the turn), fully banking the hull into the turn. At this point (when the included angle of the aft swept flow interrupter is 45°) the port portion of the interceptor plate is parallel to the flow and generates no lift to counter the lift from the starboard side. With the hull fully banked to port and the port interceptor generating drag and no lift, due to the port interceptor being close to the LCG, the hull substantially pivots into the turn around its LCG. Once the turn is stopped and forward motion resumed the forces return to the configuration of FIG. 6A.

Each of the above described embodiments using ventilated areas formed by ventilated steps or ventilation holes or passages and any of the previously described flow interrupters will turn sharply in a low radius, pivot like turn as described above.

Although an illustrative embodiment has been described herein with reference to the accompanied drawings, it is to be understood that this invention is not limited to these precise embodiments, but that various changes in modifications might be affected therein by one skilled in the art without departing from the scope or spirit of the invention.

What is claimed is:

1. A watercraft hull having a centerline and a bottom planing surface facing the water and at least one ventilated area in at least a part of said bottom planing surface which is in contact with the water during planing; said ventilated area having an aft swept configuration comprising a generally V shaped configuration whose apex is on the centerline of the hull and swept aft from there; and an aft swept means for forming a water flow interrupter projecting downwardly from the hull forward of said ventilated area; said water flow interrupter means and ventilated area being located to provide a center of lift forward of the LCG of the hull.

2. A watercraft hull having at least one ventilated area in at least a part of its bottom planing surface facing the water; said ventilated area having an aft swept configuration and an aft swept means for forming a water flow interrupter projecting downwardly from the hull forward of said ventilated area; said water flow interrupter means being located to provide a center of lift forward of the LCG of the hull; and wherein said ventilated area of the hull and said means for forming a water flow interrupter are generally V shaped having generally angularly related legs defining an included angle of between 30° and 70°.

3. A watercraft hull having at least one ventilated area in at least a part of its bottom planing surface facing the water; said ventilated area having an aft swept configuration and an aft swept means for forming a water flow interrupter projecting downwardly from the hull forward of said ventilated area; said water flow interrupter means being located to provide a center of lift forward of the LCG of the hull; and wherein said ventilated area comprises a step formed in the hull.

4. A watercraft hull as defined in claim 1, wherein said ventilated area comprises a plurality of ventilation holes or channels formed in the hull bottom and communicating with the air above the water line of the hull.

5. A watercraft hull as defined in any of claims 1 to 4, wherein said water flow interrupter means is a wedge shaped protrusion on said hull bottom.

6. A watercraft hull as defined in any of claims 1 to 4, wherein said water flow interrupter means is an interceptor plate mounted on the hull.

7. A watercraft hull as defined in claim 6, wherein said interceptor plate is mounted on the hull for movement vertically between a first retracted position and a second fully extended position.

8. A watercraft hull as defined in any of claims 1 to 4, wherein said water flow interrupter means comprises a concave cambered surface area formed in said hull bottom forward of said ventilated area.

9. A watercraft hull having a bottom surface for planing on water, said bottom surface having at least one ventilated area; and water flow interrupter means projecting downwardly from the hull forward of said ventilated area for causing the separation of water from the hull at and aft of said ventilated area thereby increasing the unwetted surface area of the hull bottom during operation of the watercraft; said ventilated area and said water flow interrupter having a complementary aft swept configuration having angularly related legs defining an included angle of between 30° and 70° and being located to provide a center of lift forward of the LCG of the hull.

10. A watercraft hull as defined in claim 9 wherein said ventilation area is a ventilation step, formed in the hull comprising a recessed cavity in the hull bottom opening towards the water and having a forward leading edge, said recess having a forward wall portion at the leading edge of the step which is generally perpendicular to the hull bottom.

11. A watercraft hull as defined in claim 10, wherein said at least one step extends from one side of the hull to the other.

12. A watercraft hull as defined in claim 9, wherein said ventilated area comprises a plurality of ventilation holes or channels formed in the hull bottom and communicating with the air above the water line of the hull.

13. A watercraft hull as defined in any of claims 9 to 12, wherein said means is a wedge shaped protrusion on said hull bottom which extends from a forward end thereof on the hull bottom forward of said ventilated area to a rear end adjacent said leading edge of said ventilated area which projects down into the water further than said forward end.

14. A watercraft hull as defined in any of claims 9 to 12, wherein said means comprises an interceptor plate mounted on said hull bottom at or immediately forward of said ventilation area.

15. A watercraft hull as defined in claim 14, wherein said interceptor plate is mounted for movement between a first retracted position to and a second fully extended position.

16. A watercraft hull as defined in any of claims 9 to 12, wherein said means comprises a cambered surface area formed in said hull bottom forward of said ventilated area.

17. A watercraft hull as defined in claim 16, wherein said cambered surface is concave relative to the water and has a trailing end located adjacent said ventilated area.

18. A watercraft hull as defined in claim 1, wherein said ventilated area comprises a step formed in the bottom of said hull including a central section having a central pair of angularly related aft swept legs and a pair of outboard legs respectively connected to the central pair of aft swept legs which are swept forward therefrom to the sides of the hull.

19. A watercraft hull as defined in claim 18, including a pair of aft swept flow interrupters located in the hull bottom aft of the LCG and outboard of said central pair of angularly related aft swept legs of said central section of the ventilated area.

20. A watercraft hull as defined in claim 19, including means for providing air flow communication from the area beneath the hull immediately aft of the central pair of angularly related aft swept legs of said central section of the ventilated area and areas immediately aft of said pair of aft swept flow interrupters located in the hull bottom aft of the LCG and outboard of said central pair of aft swept legs of said central section of the ventilated area.

21. A watercraft hull as defined in claim 20, including a pair of mid-running strakes formed in the bottom of the hull generally parallel to and on opposite sides of the hull keel and spaced outwardly thereof; said means for providing air flow communication comprising a channel formed across each of said strakes.

22. A watercraft hull as defined in claim 10, wherein said ventilation step includes a central section including said aft swept angularly related legs and a pair of outboard legs respectively connected to the central pair of aft swept legs which are swept forward therefrom to the sides of the hull.

23. A watercraft hull as defined in claim 22, including a pair of aft swept flow interrupters located in the hull bottom aft of the LCG and outboard of said central pair of angularly related aft swept legs of said central section of the ventilated area.

24. A watercraft hull as defined in claim 23, including means for providing air flow communication from the area beneath the hull immediately aft of the central pair of angularly related aft swept legs of said central section of the ventilated area and areas immediately aft of said pair of aft swept flow interrupters located in the hull bottom aft of the LCG and outboard of said central pair of aft swept legs of said central section of the ventilated area.

25. A watercraft hull as defined in claim 24, including a pair of mid running strakes formed in the bottom of the hull generally parallel to and on opposite sides of the hull keel and spaced outwardly thereof; said means for providing air flow communication comprising a channel formed across each of said strakes.

* * * * *